United States Patent [19]

Coupland et al.

[11] Patent Number: 4,821,518
[45] Date of Patent: Apr. 18, 1989

[54] CLUTCH BOOSTER WITH OVERCENTER MEANS

[75] Inventors: Ralph Coupland; Colm M. P. Keegan, both of Lincoln, United Kingdom

[73] Assignee: Clayton Dewandre Co. Ltd., Lincoln, United Kingdom

[21] Appl. No.: 116,985

[22] Filed: Nov. 5, 1987

[30] Foreign Application Priority Data

Nov. 5, 1986 [GB] United Kingdom ............... 8626480

[51] Int. Cl.⁴ ........................... F15B 3/00; F01B 31/00
[52] U.S. Cl. ....................... 60/579; 60/594; 92/7; 92/130 R
[58] Field of Search .................. 92/7, 130 R, 131; 60/579, 594; 91/344

[56] References Cited

U.S. PATENT DOCUMENTS

| 344,003 | 6/1886 | Morrison | 92/7 |
|---|---|---|---|
| 1,103,020 | 7/1914 | Austin | 92/7 |
| 2,170,240 | 8/1939 | Fitch | 92/7 X |
| 3,769,788 | 11/1973 | Korpek, III | 92/7 X |

FOREIGN PATENT DOCUMENTS

| 181761 | 5/1986 | European Pat. Off. | |
| 151193 | of 0000 | Fed. Rep. of Germany | 92/7 |
| 132051 | of 0000 | Fed. Rep. of Germany | 92/7 |
| 135888 | of 0000 | Fed. Rep. of Germany | 92/7 |
| 170179 | of 0000 | Fed. Rep. of Germany | 92/7 |
| 1285817 | 12/1968 | Fed. Rep. of Germany | |
| 841039 | 4/1941 | France | |
| 2225639 | 11/1974 | France | |

Primary Examiner—Robert E. Garrett
Assistant Examiner—Mark A. Williamson
Attorney, Agent, or Firm—J. B. Sotak

[57] ABSTRACT

A booster device for reducing the pedal force required to release the clutch on automotive vehicles. It is capable of either replacing the conventional clutch master cylinder (FIG. 4) or acting as an additional slave and master cylinder (FIGS. 1 to 3). An overcenter mechanism acts on the piston 4 intermediate its end to assist movement in opposite directions beyond a central point. To avoid unbalanced side loads, the overcenter mechanism includes two radially opposed spring (8) biased arms (5) the inner ends of which bear in cup-shaped recesses (6A) on opposite sides of a plug (6) sliding in a transverse bore through the piston (4).

8 Claims, 3 Drawing Sheets

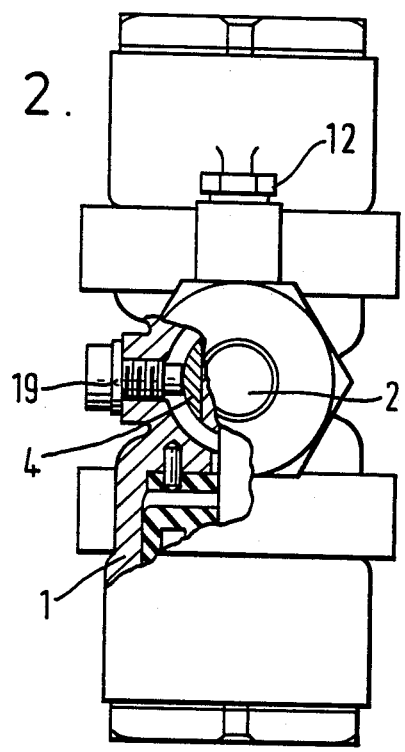
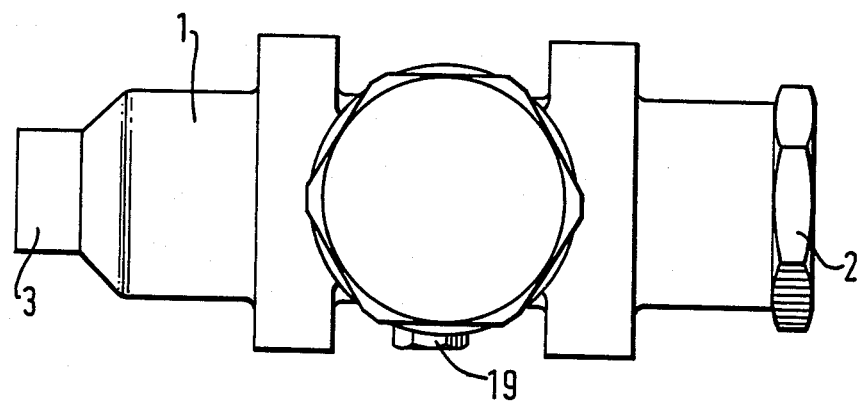

CLUTCH BOOSTER WITH OVERCENTER MEANS

This invention relates to booster devices for reducing the pedal force required to release the clutch on automotive vehicles having engines of relatively high capacity and its object is to provide a device of this nature which is capable of either replacing the conventional clutch master cylinder or acting as an additional slave and master cylinder when inserted in the line between the usual master and slave cylinders.

According to the present invention, such a device comprises a hydraulic cylinder in which movement of the piston in opposite directions beyond a predetermined point is assisted by overcenter means acting on the piston intermediate its ends and which conveniently is located in a chamber for recuperation fluid formed in the central portion of the cylinder. The overcenter means preferably acts on the piston under the influence of suitable biasing means providing balanced radial force, for example, springs acting in different radial directions spaced and conveniently equally angularly spaced, around the piston axis.

In the preferred embodiment, the device comprises a master cylinder, the overcenter means being arranged to boost the output pressure during working stroke travel beyond the predetermined point and to bias the piston for recuperation during return stroke travel beyond the predetermined point.

Embodiments of this invention will now be described by way of example with reference to the accompanying drawings in which:

FIG. 2 is a part cross-sectional end elevation of the booster device shown in FIG. 1;

FIG. 3 is a plan view of the booster device shown in FIGS. 1 and 2; and

Figure 1:
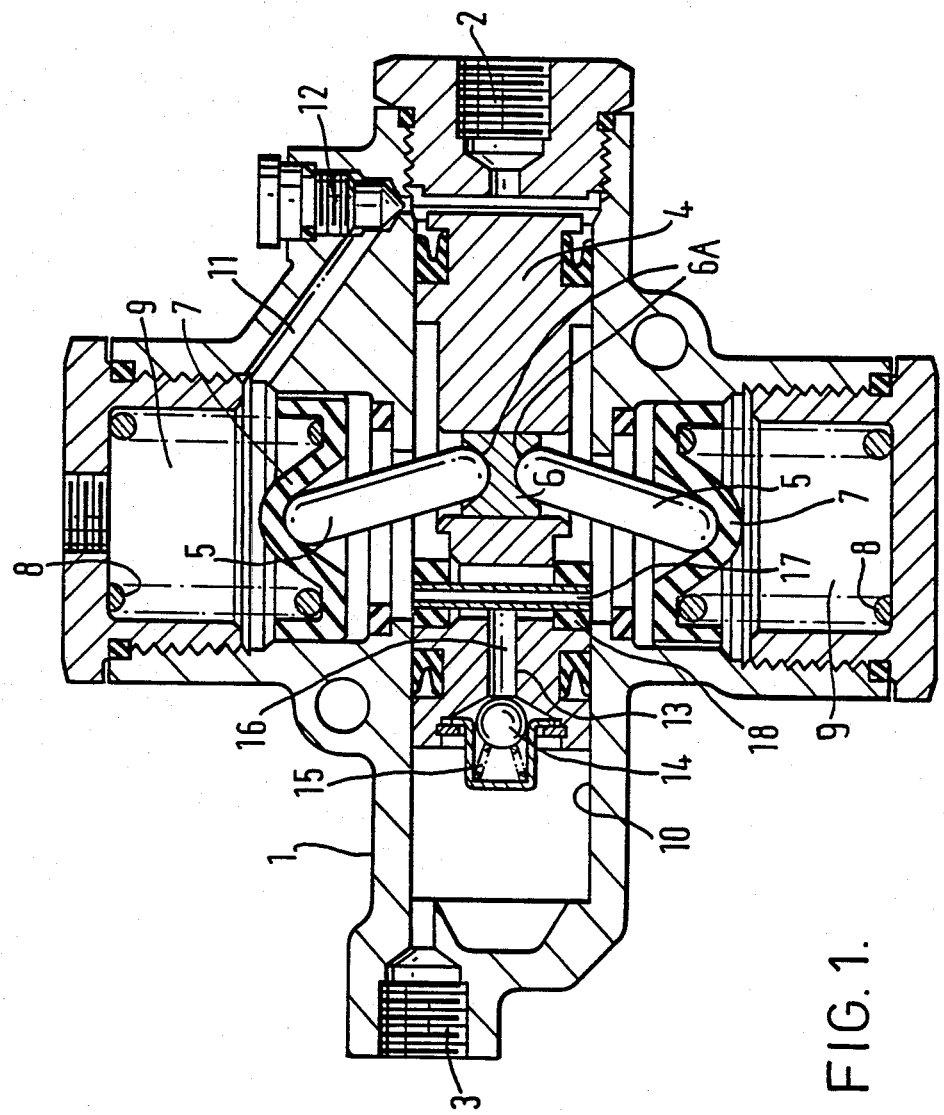
FIG. 1 is a cross-sectional elevational of a booster device.

The booster device of FIGS. 1 to 3 includes a cylinder 1 having an input port 2 for connection to a clutch master cylinder and an output port 3 for connection to a hydrostatic slave cylinder. A piston 4 working in the cylinder 1, is acted on intermediate its ends, by overcenter means serving to assist movement of the piston in opposite directions beyond a predetermined point. The overcenter means may act directly on the piston under the influence of springs acting in different radial directions but spaced around the piston axis to provide balanced side or lateral loading.

In the illustrated embodiment, the problem of side loading is avoided in that the overcenter means comprises two spring-loaded arms which are diametrically opposed and the remote radially inner ends of which rest in cup-shaped recess 6A in a plug 6 slidably received in a bore in the piston 4 normal to the piston axis. The outer ends of the arms 5 engage dished spring guides 7 acted upon in opposite directions by springs 8 located in chambers 9 communicating with an annular recuperation space around the piston 4.

The upper chamber 9 is supplied with hydraulic fluid from the master cylinder reservoir and communicates with the cylinder bore 10 on opposite sides of the piston 4 via a cylinder passage 11 controlled by a bleed screw 12 on the one hand and a piston passage 13 controlled by a recuperation ball valve 14 on the other hand. The ball valve 14 is biased towards a closed position by a spring 15 and can be moved into an open position by a fluted rod 16 passing through the passage 13 for engagement with a tension pin 17 serving to retain the two halves of an annular collar 18 which, in the rest position of the piston, shown in FIG. 1, engages a stop peg 19 projecting into its path from the cylinder 1.

Actuation of the clutch pedal operates through the master cylinder to build up the pressure at the input port 2 sufficiently to move the piston 4 to the left, as viewed in FIG. 1, against the action of the toggle springs 8. Initial movement of the piston 4 relative to the rod 16 permits the spring 16 to close the ball valve 14 and thus enable pressure to be applied to the fluid in front of the piston in order to effect clutch release and as soon as the toggle arms 5 have passed the vertical, the overcenter means will assist the further movement of the piston required to release the clutch.

The assistance provided by the overcenter means will preferably not exceed 30% of the total force required to release the clutch since, on release of the clutch pedal, the clutch springs will be required to exert a return force sufficient to move the overcenter means past the vertical in the opposite direction. Thereafter the piston is returned to its rest position without further aid from the clutch springs. Prior to the end of its return movement the piston collar 18 engages the stop peg 19 (FIG. 2) whereupon the pin 17 is operable through the rod 16 to push the ball valve 14 off its seat to permit recuperation of fluid to take place.

Figure 4:
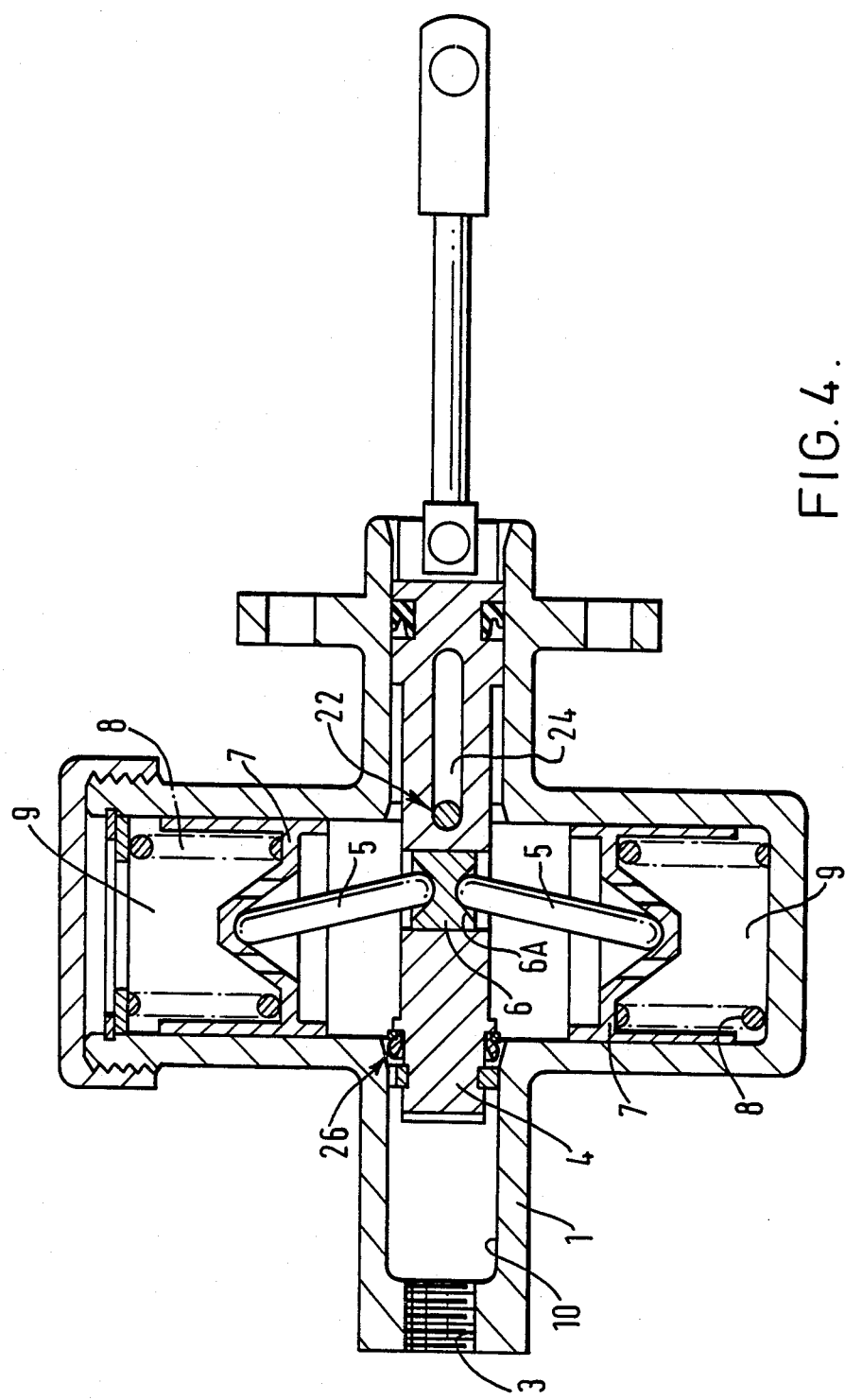
FIG. 4 is a cross-sectional elevation of another embodiment of booster device.

In the embodiment of FIG. 4 designed to replace the conventional clutch master cylinder, the passage 11 and bleed screw 12 are omitted, and the piston 4 is connected at its input end to a push rod 20 operated by the clutch pedal (not shown). Also, a back stop is provided by a transverse pin 22 passing through a slot 24 in the piston 4. This also serves to prevent rotation of the piston 4.

Recuperation 26 in this embodiment is arranged as described in our European Patent application No. 0181761 (85308038.0), the upper spring chamber 9 serving as a reservoir in communication with an annular space around the piston 4.

In both embodiments the overcenter means providing the mechanical assistance is located within the recuperation fluid chamber thus allowing of a compact construction and the springs 8 act in opposition to one another without spacing side loads on the piston.

The piston in the hydrostatic slave cylinder connected to the output of the cylinder 1, is preferably spring biased in a direction to maintain the piston or an actuating member thereon, in contact with the clutch release bearing in order to progressively take up wear on the clutch plates.

We claim:

1. A booster device comprising, a hydraulic cylinder, a piston movable in the cylinder and wherein movement of the piston in opposite directions beyond a predetermined point is assisted by an overcenter means acting on the piston intermediate its ends, the overcenter means acts under the influence of biasing means acting in different radial directions spaced around the piston axis to provide substantially balanced radial forces, and the overcenter means bears upon a radially floating element which is carried by the piston and acts under the influence of the biasing means which provide the balanced radial forces.

2. The device, according to claim 1 comprising, a transverse bore formed in the piston, a plug slidably received in the bore, and two arms, the inner ends of which bear on opposite sides of the plug, and a biasing means bearing on the outer end of each arm and acting in radially opposite directions.

3. A device, according to claim 2, wherein the biasing means includes a dished guide engaging the outer end of each of the two arms and being urged radially inwardly with respect to the piston axis by springs housed within a chamber communicating with the cylinder.

4. A device, according to claim 1 which includes a master cylinder in which the overcenter means is arranged to boost the output pressure during working stroke travel beyond the predetermined point and to bias the piston for recuperation during return stroke travel beyond the predetermined point.

5. A booster device for a hydraulic system comprising, a cylinder and a reciprocating piston, an overcenter means having two spring-loaded arms which are diametrically-opposed, each of said two spring-loaded arms having their inner ends resting against a slidable plug which is located in a recess formed in the intermediate portion of the piston and having their outer ends engaging a dished spring guide so that movement of the piston is assisted by the overcenter means when the two spring-loaded arms pass a center point.

6. The booster device, as defined in claim 5, wherein the two spring-loaded arms are biased by helical toggle springs.

7. The booster device, as defined in claim 6, wherein the two spring-loaded arms are urged radially inwardly toward the piston by the helical toggle springs.

8. The booster device, as defined in claim 5, wherein the slidable plug includes a cup-shaped recess on tow opposed sides for receiving the inner ends of the two spring-loaded arms.

* * * * *

UNITED STATES PATENT AND TRADEMARK OFFICE
CERTIFICATE OF CORRECTION

PATENT NO. : 4,821,518
DATED : April 18, 1989
INVENTOR(S) : Ralph Coupland and Colm Michael Patrick Keegan It is certified that error appears in the above-identified patent and that said Letters Patent is hereby corrected as shown below:

Column 4, line 15, delete "tow" and insert --two--

Signed and Sealed this

Twentieth Day of February, 1990

Attest:

JEFFREY M. SAMUELS

Attesting Officer

Acting Commissioner of Patents and Trademarks